United States Patent [19]
Simonson et al.

[11] Patent Number: 6,058,891
[45] Date of Patent: May 9, 2000

[54] DEW CLAW PROTECTIVE COVER

[76] Inventors: Dwight A. Simonson; George E. Simonson, both of Rte. 2 Box 46A, Hixton, Wis. 54635

[21] Appl. No.: 09/160,163

[22] Filed: Sep. 25, 1998

[51] Int. Cl.[7] .............................. A01K 13/00; B68C 5/00
[52] U.S. Cl. ................................. 119/851; 54/82
[58] Field of Search ................. 54/82; 119/850, 119/851; 168/6

[56] References Cited

U.S. PATENT DOCUMENTS

| | | | |
|---|---|---|---|
| 235,447 | 12/1880 | Milliman | 54/82 |
| 3,273,540 | 9/1966 | Fuentes, Jr. | 119/851 |
| 5,226,191 | 7/1993 | Mitchell | 54/82 X |

Primary Examiner—Robert P. Swiatek

[57] ABSTRACT

A dew claw protective cover for wrapping around the leg of an animal, in particular a cow, to cover the dew claw on the leg of the animal. The protective cover includes a flexible panel having a pair of end regions and a middle region interposed between the end regions of the panel. The middle region has a bubble extending outwardly from the exterior surface of the panel such that the bubble defines an arcuate recess in the interior surface of the panel adapted for receiving therein a dew claw of the animal when the panel is wrapped around the leg of the animal.

17 Claims, 3 Drawing Sheets

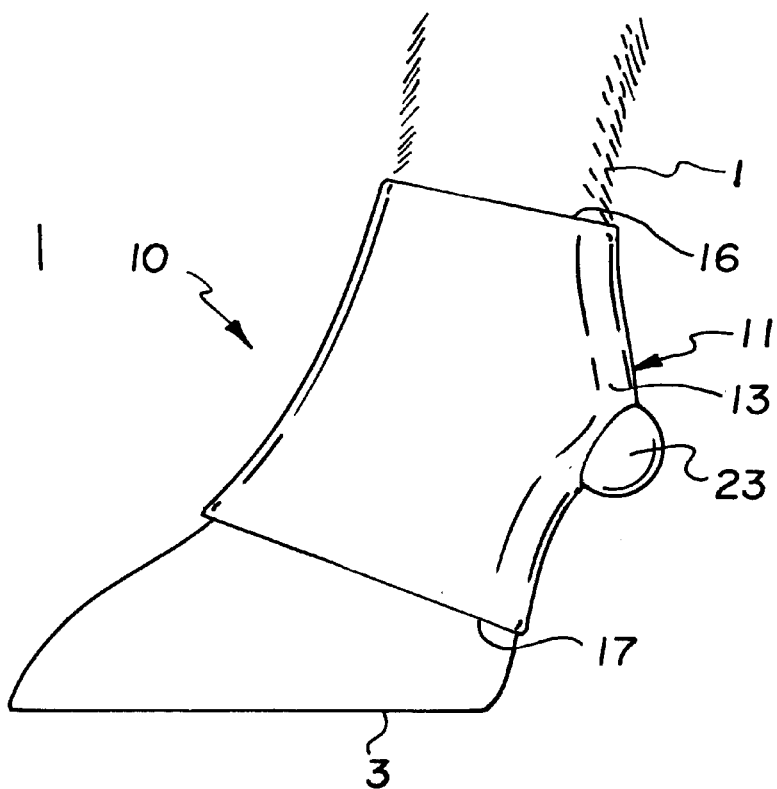
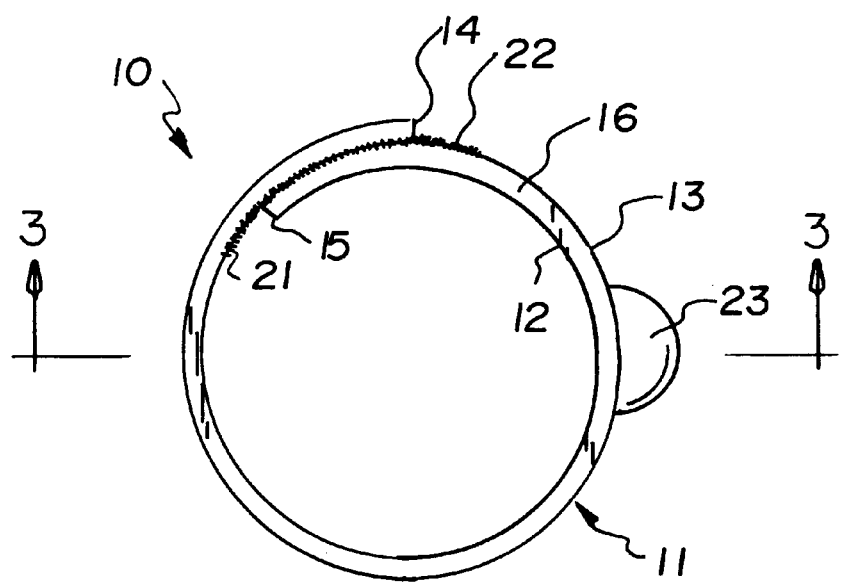

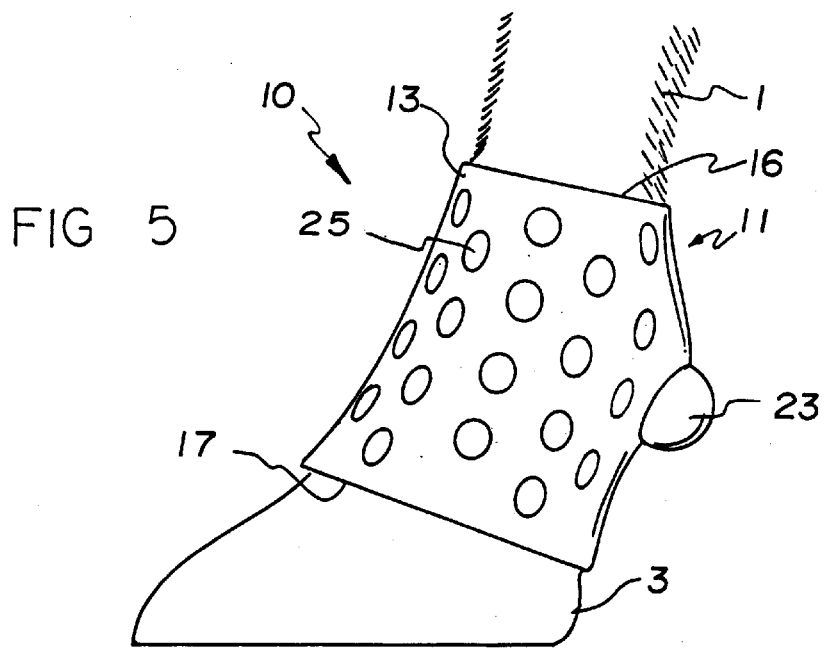
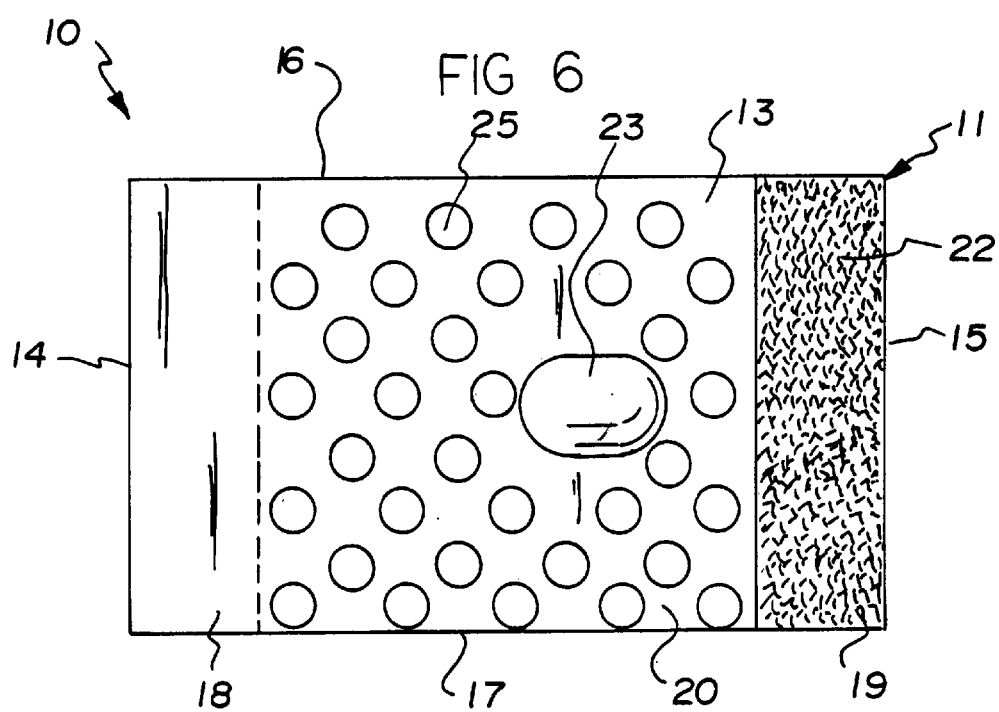

DEW CLAW PROTECTIVE COVER

BACKGROUND OF THE INVENTION

1. Field of the Invention

The present invention relates to protective covers for animal hoofs and more particularly pertains to a new dew claw protective cover for wrapping around the leg of an animal, in particular a cow, to cover the dew claw on the leg of the animal.

2. Description of the Prior Art

The use of protective covers for animal hoofs is known in the prior art. More specifically, protective covers for animal hoofs heretofore devised and utilized are known to consist basically of familiar, expected and obvious structural configurations, notwithstanding the myriad of designs encompassed by the crowded prior art which have been developed for the fulfillment of countless objectives and requirements.

Known prior art protective covers for animal hoofs include U.S. Pat. Nos. 5,209,048; 2,197,537; 5,638,905; Des. 365,894; 4,444,269; and 3,273,540.

While these devices fulfill their respective, particular objectives and requirements, the aforementioned patents do not disclose a new dew claw protective cover. The inventive device includes a flexible panel having a pair of end regions and a middle region interposed between the end regions of the panel. The middle region has a bubble extending outwardly from the exterior surface of the panel such that the bubble defines an arcuate recess in the interior surface of the panel adapted for receiving therein a dew claw of the animal when the panel is wrapped around the leg of the animal.

In these respects, the dew claw protective cover according to the present invention substantially departs from the conventional concepts and designs of the prior art, and in so doing provides an apparatus primarily developed for the purpose of wrapping around the leg of an animal, in particular a cow, to cover the dew claw on the leg of the animal.

SUMMARY OF THE INVENTION

In view of the foregoing disadvantages inherent in the known types of protective covers for animal hoofs now present in the prior art, the present invention provides a new dew claw protective cover construction wherein the same can be utilized for wrapping around the leg of an animal, in particular a cow, to cover the dew claw on the leg of the animal.

The general purpose of the present invention, which will be described subsequently in greater detail, is to provide a new dew claw protective cover apparatus and method which has many of the advantages of the protective covers for animal hoofs mentioned heretofore and many novel features that result in a new dew claw protective cover which is not anticipated, rendered obvious, suggested, or even implied by any of the prior art protective covers for animal hoofs, either alone or in any combination thereof.

To attain this, the present invention generally comprises a flexible panel having a pair of end regions and a middle region interposed between the end regions of the panel. The middle region has a bubble extending outwardly from the exterior surface of the panel such that the bubble defines an arcuate recess in the interior surface of the panel adapted for receiving therein a dew claw of the animal when the panel is wrapped around the leg of the animal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dew claw protective cover apparatus and method which has many of the advantages of the protective covers for animal hoofs mentioned heretofore and many novel features that result in a new dew claw protective cover which is not anticipated, rendered obvious, suggested, or even implied by any of the prior art protective covers for animal hoofs, either alone or in any combination thereof.

It is another object of the present invention to provide a new dew claw protective cover which may be easily and efficiently manufactured and marketed.

It is a further object of the present invention to provide a new dew claw protective cover which is of a durable and reliable construction.

An even further object of the present invention is to provide a new dew claw protective cover which is susceptible of a low cost of manufacture with regard to both materials and labor, and which accordingly is then susceptible of low prices of sale to the consuming public, thereby making such dew claw protective cover economically available to the buying public.

Still yet another object of the present invention is to provide a new dew claw protective cover which provides in the apparatuses and methods of the prior art some of the advantages thereof, while simultaneously overcoming some of the disadvantages normally associated therewith.

Still another object of the present invention is to provide a new dew claw protective cover for wrapping around the leg of an animal, in particular a cow, to cover the dew claw on the leg of the animal.

Yet another object of the present invention is to provide a new dew claw protective cover which includes a flexible panel having a pair of end regions and a middle region interposed between the end regions of the panel. The middle region has a bubble extending outwardly from the exterior surface of the panel such that the bubble defines an arcuate recess in the interior surface of the panel adapted for receiving therein a dew claw of the animal when the panel is wrapped around the leg of the animal.

Still yet another object of the present invention is to provide a new dew claw protective cover that covers the dew claw of the cow to prevent injury to the teats of the cow from their stepping on their teats and stabbing the teats with their dew claws.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new dew claw protective cover according to the present invention wrapped around the leg of an animal to cover the dew claw of the animal.

FIG. 2 is a schematic top side view of the present invention in the wrapped configuration.

FIG. 5 is a schematic side view of an optional preferred embodiment of the present invention wrapped around the leg of an animal.

FIG. 6 is a schematic exterior side view of the optional preferred embodiment of the present invention in FIG. 5 in an unwrapped flat configuration.

DESCRIPTION OF THE PREFERRED EMBODIMENT

Figure 3:
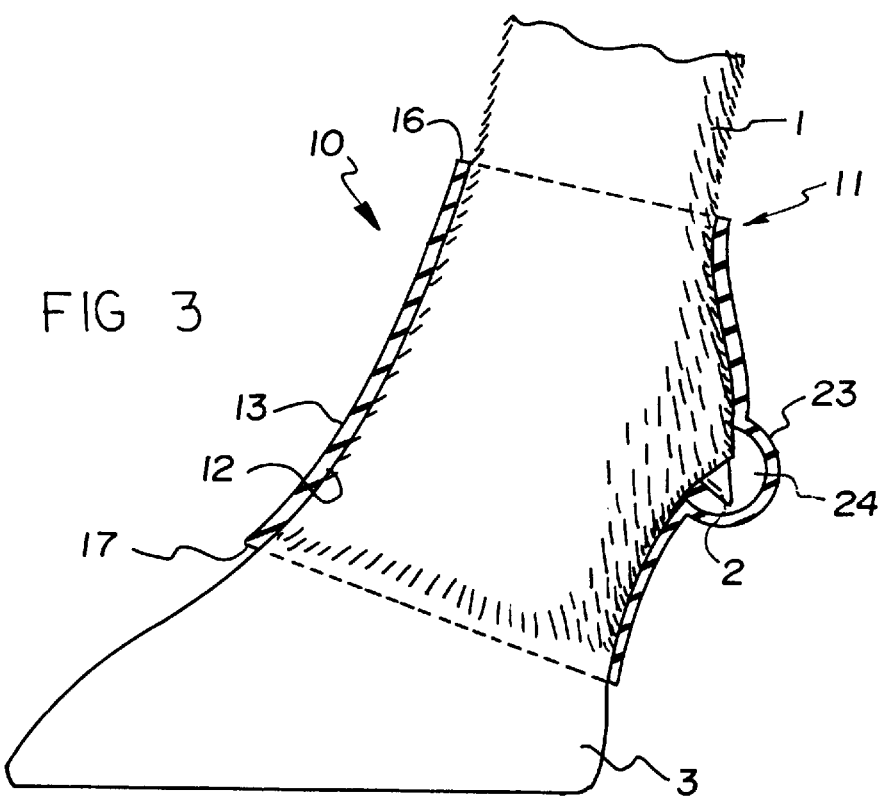
FIG. 3 is a schematic cross sectional view of the present invention taken from line 3—3 of FIG. 2 and illustrating the positioning of the dew claw of the animal in the recess of the panel.
Figure 4:
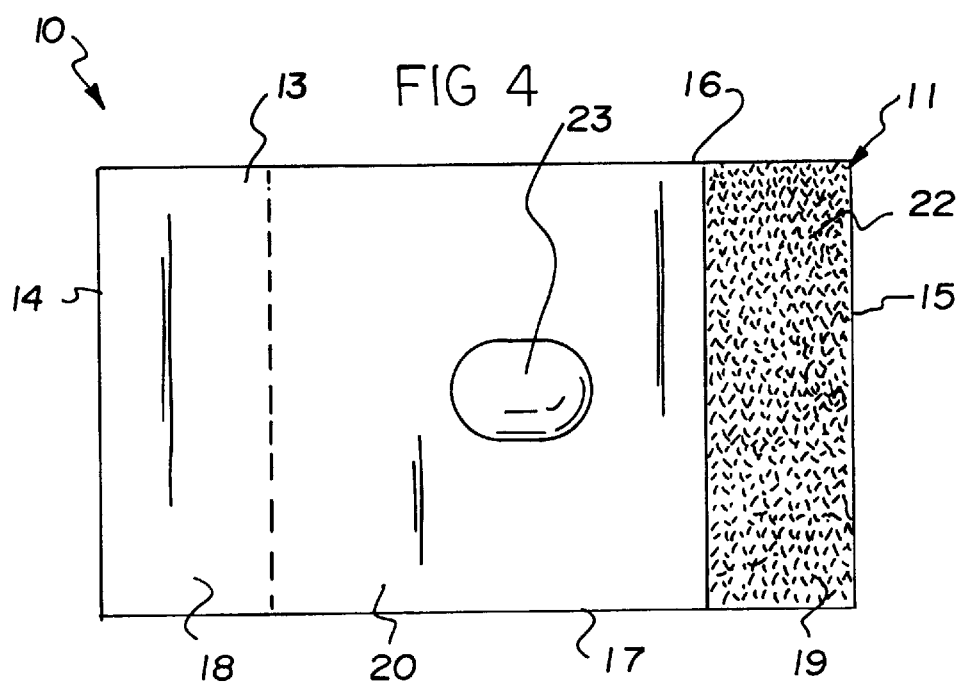
FIG. 4 is a schematic exterior side view of the present invention in an unwrapped flat configuration.

With reference now to the drawings, and in particular to FIGS. 1 through 6 thereof, a new dew claw protective cover embodying the principles and concepts of the present invention and generally designated by the reference numeral 10 will be described.

In use, the protective cover 10 is designed for wrapping around the leg 1 of an animal, in particular a cow, to cover the dew claw 2 on the leg 1 of the animal to prevent injury to the teats of the cow from the stabbing of dew claws 2 when a cow steps on the teats with their hoofs 3. As best illustrated in FIGS. 1 through 6, the dew claw protective cover 10 generally comprises a flexible panel 11 having a pair of end regions 18,19 and a middle region 20 interposed between the end regions 18,19 of the panel 11. The middle region 20 has a bubble 23 extending outwardly from the exterior surface 13 of the panel 11 such that the bubble 23 defines an arcuate recess 24 adapted for receiving therein a dew claw 2 of the animal when the panel 11 is wrapped around the leg 1 of the animal.

In closer detail, the flexible panel 11 is generally rectangular and has interior and exterior surfaces 12,13, a pair of generally straight ends 14,15, and a pair of generally straight sides 16,17 extending between the ends 14,15 of the panel 11. The panel 11 is designed for wrapping around a leg 1 of an animal adjacent a hoof 3 of the animal to cover a dew claw 2 of the animal with one of the sides 17 of the panel 11 positioned adjacent the hoof 3 of the animal. The interior surface 12 of the panel 11 is designed for facing the leg 1 of the animal when the panel 11 is wrapped around the leg 1 of the animal. Ideally, the panel 11 comprises a flexible woven fabric material. Optionally, the panel 11 may comprise a flexible neoprene.

The ends 14,15 of the panel 11 are extended generally parallel to one another while the sides 16,17 of the panel 11 are extended generally parallel to one another and generally perpendicular to the ends 14,15 of the panel 11. The panel 11 has a length defined between the ends 14,15 of the panel 11, a width defined between the sides 16,17 of the panel 11, and a thickness defined between the interior and exterior sides 16,17 of the panel 11. Preferably, the length of the panel 11 is greater than about 5 inches, the width of the panel 11 is greater than about 3 inches, and the thickness of the panel 11 is less than about ½ inch. Ideally, the length of the panel 11 is about 10 inches, the width of the panel 11 is about 6 inches, and the thickness of the panel 11 is less than about ¼ inch.

The panel 11 has a pair of end regions 18,19. Each of the end regions 18,19 of the panel 11 is generally rectangular. One of the end regions 18 of the panel 11 is positioned adjacent one of the ends 14 of the panel 11 and another of the end regions 19 is located adjacent another of the ends 15 of the panel 11. Each of the end regions 18,19 of the panel 11 has a length extending between the sides 16,17 of the panel 11 and a width defined in a direction extending between the ends 14,15 of the panel 11. The end regions 18,19 of the panel 11 are designed for attachment to one another when the panel 11 is wrapped around the leg 1 of the animal. Preferably, a hook and loop fastener detachably attaches the end regions 18,19 of the panel 11 together when the panel 11 is wrapped around the leg 1 of the animal. The hook and loop fastener has a pair of complementary components 21,22 including a loops component and a hooks component. One of the complementary components 21 of the hook and loop fastener is provided on the interior surface 12 of the panel 11 in one of the end regions 18 of the panel 11 and another of the complementary components 22 of the hook and loop fastener is provided on the exterior surface 13 of the panel 11 in another of the end regions 19 of the panel 11. Ideally, the complementary components 21,22 of the hook and loop fastener substantially cover the end region of the panel 11 associated therewith.

The panel 11 also has a middle region 20 interposed between the end regions 18,19 of the panel 11. The middle region 20 is generally rectangular and has a width extending between the end regions 18,19 of the panel 11 and a length extending between the sides 16,17 of the panel 11. Preferably, the lengths of the end regions 18,19 and the middle region 20 of the panel 11 are equal to the width of the panel 11. Ideally, the widths of the end regions 18,19 of the panel 11 are generally equal to each other. Also ideally, the width of the middle region 20 of the panel 11 is at least two times greater than the width of either end portion of the panel 11.

The middle region 20 has a dome-shaped arcuate bubble 23 extending outwardly from the exterior surface 13 of the panel 11. The bubble 23 defines an arcuate recess 24 in the interior surface 12 of the panel 11 adapted for receiving therein a dew claw 2 of the animal when the panel 11 is wrapped around the leg 1 of the animal. The bubble 23 preferably has a generally oblong lower periphery adjacent the exterior surface 13 of the panel 11. The oblong or elongated bubble 23 has a longitudinal axis preferably extending parallel to and midway between the sides 16,17 of the panel 11. The lower periphery of the bubble 23 has a length measured along the longitudinal axis of the lower periphery of the bubble 23 and a width defined generally perpendicular to the longitudinal axis of the lower periphery of the bubble 23. The length of the lower periphery of the bubble 23 is greater than the width of the lower periphery of the bubble 23. Ideally, the lower periphery of the bubble 23 is spaced apart from the side 17 of the panel 11 positioned adjacent the hoof 3 of the animal about 1½ inches.

Optionally, the middle region 20 of the panel 11 may also have a plurality of vent holes 25 therethrough extending between the interior and exterior surfaces 12,13 of the panel 11. The vent holes 25 are designed for permitting the passage of air through the middle region 20 of the panel 11 when the panel 11 is wrapped around the leg 1 of the animal to help prevent sweating of the leg 1 of the animal and which can aggravate any soreness caused by the panel 11 rubbing on the leg 1 of the animal. Each of the vent holes 25 preferably has a generally circular periphery and a diameter. The diameter of each of the vent holes 25 is less than the width of the lower periphery of the bubble 23. Ideally, the diameters of the vent holes 25 are generally equal to each other.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A protective cover for wrapping around the leg of an animal to cover a dew claw on a leg of the animal, said protective cover comprising:

a flexible panel having interior and exterior surfaces, a pair of ends, and a pair of sides extending between the ends of the panel, said panel being adapted for wrapping around a leg of an animal adjacent a hoof of the animal to cover a dew claw of the animal, said interior surface of said panel being adapted for facing the leg of the animal when said panel is wrapped around the leg of the animal;

said panel having a pair of end regions, one of said end regions of said panel being positioned adjacent one of said ends of said panel, another of said end regions being located adjacent another of said ends of said panel;

said end regions of said panel being adapted for attachment to one another when said panel is wrapped around the leg of the animal;

said panel having a middle region interposed between said end regions of said panel; and said middle region having a bubble extending outwardly from said exterior surface of said panel, said bubble defining an arcuate recess in said interior surface of said panel adapted for receiving therein a dew claw of the animal when the panel is wrapped around the leg of the animal;

wherein said panel is generally rectangular, wherein each of said end regions of said panel is generally rectangular, and wherein said middle region is generally rectangular.

2. The protective cover of claim 1, wherein said panel has a length defined between said ends of said panel, wherein said panel has a width defined between said sides of said panel, wherein said panel has a thickness defined between said interior and exterior sides of said panel, wherein said length of said panel is greater than about 5 inches, wherein said width of said panel is greater than about 3 inches, and wherein said thickness of said panel is less than about ½ inch.

3. The protective cover of claim 2, wherein said length of said panel is about 10 inches, wherein said width of said panel is about 6 inches, wherein said thickness of said panel is less than about ¼ inch.

4. The protective cover of claim 1, wherein each of said end regions of said panel has a length extending between said sides of said panel and a width defined in a direction extending between said ends of said panel, wherein said middle region has a width extending between said end regions of said panel and a length extending between said sides of said panel, wherein said width of the middle region of the panel is at least two times greater than the width of either end portion of the panel.

5. The protective cover of claim 4, wherein said lengths of said end regions and said middle region of said panel are equal to the width of the panel.

6. The protective cover of claim 4, wherein said widths of said end regions of said panel are generally equal to each other.

7. The protective cover of claim 1, wherein a hook and loop fastener detachably attaches said end regions of said panel together when said panel is wrapped around the leg of the animal.

8. The protective cover of claim 7, wherein said hook and loop fastener has a pair of complementary components, one of said complementary components of said hook and loop fastener being provided on said interior surface of said panel in one of said end regions of said panel, another of said complementary components of said hook and loop fastener being provided on said exterior surface of said panel in another of said end regions of said panel.

9. The protective cover of claim 8, wherein said complementary components of said hook and loop fastener substantially cover the end region of the panel associated therewith.

10. The protective cover of claim 1, wherein said bubble has a generally oblong lower periphery adjacent said exterior surface of said panel, said bubble being positioned at a middle location between said sides of said panel.

11. The protective cover of claim 1, wherein said middle region of said panel has a plurality of vent holes therethrough extending between said interior and exterior surfaces of said panel.

12. A protective cover for wrapping around the leg of an animal, in particular a cow, to cover the dew claw on the leg of the animal, said protective cover comprising:

a flexible panel being generally rectangular and having interior and exterior surfaces, a pair of generally straight ends, and a pair of generally straight sides extending between the ends of the panel, said panel being adapted for wrapping around a leg of an animal adjacent a hoof of the animal to cover a dew claw of the animal, said interior surface of said panel being adapted for facing the leg of the animal when said panel is wrapped around the leg of the animal;

wherein said panel comprises a flexible woven fabric material;

said ends of said panel being extended generally parallel to one another, said sides of said panel being extending generally parallel to one another and generally perpendicular to said ends of said panel;

said panel having a length defined between said ends of said panel, said panel having a width defined between said sides of said panel, wherein said panel has a thickness defined between said interior and exterior sides of said panel;

wherein said length of said panel is about 10 inches, wherein said width of said panel is about 6 inches, wherein said thickness of said panel is less than about ¼ inch;

said panel having a pair of end regions, each of said end regions of said panel being generally rectangular, one of said end regions of said panel being positioned adjacent one of said ends of said panel, another of said end regions being located adjacent another of said ends of said panel;

each of said end regions of said panel having a length extending between said sides of said panel, and a width defined in a direction extending between said ends of said panel;

said end regions of said panel being adapted for attachment to one another when said panel is wrapped around the leg of the animal;

wherein a hook and loop fastener detachably attaches said end regions of said panel together when said panel is wrapped around the leg of the animal, said hook and loop fastener having a pair of complementary components;

one of said complementary components of said hook and loop fastener being provided on said interior surface of said panel in one of said end regions of said panel, another of said complementary components of said hook and loop fastener being provided on said exterior surface of said panel in another of said end regions of said panel;

wherein said complementary components of said hook and loop fastener substantially cover the end region of the panel associated therewith;

said panel having a middle region interposed between said end regions of said panel, said middle region being generally rectangular and having a width extending between said end regions of said panel and a length extending between said sides of said panel;

wherein said lengths of said end regions and said middle region of said panel are equal to the width of the panel;

wherein said widths of said end regions of said panel are generally equal to each other;

wherein said width of the middle region of the panel is at least two times greater than the width of either end portion of the panel;

said middle region having an arcuate bubble extending outwardly from said exterior surface of said panel, said bubble defining an arcuate recess in said interior surface of said panel adapted for receiving therein a dew claw of the animal when the panel is wrapped around the leg of the animal;

said bubble having a generally oblong lower periphery adjacent said exterior surface of said panel, said bubble being positioned at a middle location between said sides of said panel;

said lower periphery of said bubble having a length collinear with said longitudinal axis of said lower periphery of said bubble, said lower periphery having a width defined generally perpendicular to said longitudinal axis of said lower periphery of said bubble, said length of said lower periphery of said bubble being greater than said width of said lower periphery of said bubble;

said middle region of said panel having a plurality of vent holes therethrough extending between said interior and exterior surfaces of said panel, each of said vent holes having a generally circular periphery and a diameter, wherein said diameter of each of said vent holes being less than said width of said lower periphery of said bubble; and wherein said diameters of said vent holes are generally equal to each other.

13. A protective cover for wrapping around the leg of an animal to cover a dew claw on a leg of the animal, said protective cover comprising:

a flexible panel having interior and exterior surfaces, a pair of ends, and a pair of sides extending between the ends of the panel, said panel being adapted for wrapping around a leg of an animal adjacent a hoof of the animal to cover a dew claw of the animal, said interior surface of said panel being adapted for facing the leg of the animal when said panel is wrapped around the leg of the animal;

said panel having a pair of end regions, one of said end regions of said panel being positioned adjacent one of said ends of said panel, another of said end regions being located adjacent another of said ends of said panel;

said end regions of said panel being adapted for attachment to one another when said panel is wrapped around the leg of the animal;

said panel having a middle region interposed between said end regions of said panel;

said middle region having a bubble extending outwardly from said exterior surface of said panel, said bubble defining an arcuate recess in said interior surface of said panel adapted for receiving therein a dew claw of the animal when the panel is wrapped around the leg of the animal; and said bubble having a periphery adjacent said exterior surface of said panel, said periphery having substantially semicircular ends and substantially straight sides extending between said substantially semicircular ends such that said periphery is generally oblong for receiving an elongated dew claw protruding from the leg of the animal.

14. The protective cover of claim 13, wherein a hook and loop fastener detachably attaches said end regions of said panel together when said panel is wrapped around the leg of the animal.

15. The protective cover of claim 14, wherein said hook and loop fastener has a pair of complementary components, one of said complementary components of said hook and loop fastener being provided on said interior surface of said panel in one of said end regions of said panel, another of said complementary components of said hook and loop fastener being provided on said exterior surface of said panel in another of said end regions of said panel.

16. The protective cover of claim 15, wherein said complementary components of said hook and loop fastener substantially cover the end region of the panel associated therewith.

17. The protective cover of claim 13, wherein said middle region of said panel has a plurality of vent holes therethrough extending between said interior and exterior surfaces of said panel.

\* \* \* \* \*